Patented Mar. 30, 1937

2,075,663

UNITED STATES PATENT OFFICE 2,075,663

PROCESS FOR PRODUCING CHICORY BEANS

Raymond E. Schanzer, New Orleans, La.

No Drawing. Application January 10, 1935
Serial No. 1,211

1 Claim. (Cl. 99—72)

My present invention pertains to a process of producing chicory beans and in such a manner that the resultant bean may be economically and easily handled and will at all times retain its freshness until it has been ultimately used by the blenders in conjunction with coffee or coffee substitutes.

The process further contemplates the production of chicory beans that throughout their entirety will be uniform especially when same have been roasted and ground so that no particles of the chicory will be more thoroughly roasted than any other portion of the bean.

The advantages of this process will be fully understood from the further description thereof but before entering into such detail description I feel that it would be proper to outline partially the manner in which ground chicory is now produced so that the advantages of my process will be more readily understood.

In order that the advantages of my novel process may be readily understood I deem it proper, before entering into detail description of the process to outline the present and customary manner of preparing raw chicory roots incident to the usual roasting operation. It is the general practice to carry the raw roots of chicory to the drying plant where they are washed in order to remove as far as possible all earth and dirt and after this the washed roots are put through a cutter. The cutting produces irregular shaped and sized cubes which cubes are then spread on perforated metal floors through which hot air is drawn from a furnace below the metal floors by means of an exhaust fan. This fan is usually situated on the floor above the perforated floors on which the cubed chicory has been spread for the drying process. As soon as the chicory has attained a satisfactory state of dryness it is transferred to a cooling room and after sufficiently cooled it is either loaded in cars in a loose state or sacked for shipment to the roasting plants. If not shipped it is stored in the warehouse of the drying plant awaiting further disposition. It is in this dry state that the chicory of irregular sizes is put through the roasting process after which it is ground, sacked and shipped to buyers who blend it with coffee. The purpose of cutting up and subsequently drying chicory roots is to preserve it for later use and consequently this process is nothing more or less than a dehydrating process.

With my novel process which is much more efficient and satisfactory than the method heretofore employed, I take the chicory roots after they have been washed for the purpose of removing all possible earth, dirt and foreign matter and put said washed roots through cutters which will cut the roots into thin shreds or chips. The mass thus obtained is then put through presses for the purpose of extracting the juices therefrom. This extraction produces two separate and distinct products, namely pulp on one hand and juice on the other. The pulp is then dried by means of cylindrical or other well known drying apparatus for the purpose of preserving it, while the juices are filtered and are transformed into powder by means of spraying the juices into a drying room of proper temperature where the liquid constituents of the juice are drawn off in the form of steam while the other ingredients of the juice become solidified in the form of powder thereby conditioning it for keeping or storage purposes. In order to prepare the products thus obtained, namely the dried pulp on one hand and the powdered juice on the other, for further manufacture as a product to be used in blending with coffee or coffee substitutes I pulverize the dry pulp to the consistency of dry flour and mix such resultant powder with the juice powder in proportions found by experience to be the most advisable. The mixture will then be moistened by means of steam to form a homogeneous mass. This mass is then put through a compressing machine that will turn it out in the shape of coffee beans or any other shape most expedient for its final roasting and grinding process. I would have it distinctly understood that the question of the proportion of the powdered juice to the powdered pulp is one of grave importance and was arrived at after long research and experiment and unless the specific proportion of these ingredients is not strictly adhered to the result will be of no value whatsoever in producing a marketable and eatable product. I have therefore arrived at the exact proportions necessary and hence I specifically limit myself to said proportions as follows: the powdered juice to the powdered pulp is the identical proportion as the proportion of the juice in its liquid form to the pulp in its wet state. In other words the proportion of wet pulp is the same as the proportion of the juice that has been extracted from the wet pulp in the first steps of my process.

One of the most salient features of my invention is the fact that regardless of the sizes in which the chicory root is originally cut or shredded, the elimination of fibres, stems and unroastable particles provides a finished product that is usable in its entirety.

A further and very important feature of my invention is the fact that packing and storing of the chicory beans is not attended with expensive handling costs and a further important feature is the freshness and uniformity of the chicory product when same has been roasted and ground ready for blending.

My improved process requires no unknown or special machinery to produce the bean other than the well known and various crushing, pulp producing machines, clarifiers, condensers, spraying apparatus for producing the powder from the liquid and compressing machines at present in use, in various analogous industries and now produced in the machinery market.

What I claim is:—

A process for producing chicory beans, consisting of extracting liquids from chicory roots, reducing the chicory root residue to a pulp and pulverizing the pulp to a flour like consistency, filtering the said liquids and forcing same into a chamber subjected to a temperature that will reduce the liquids to a powder of flour like consistency, mixing the flour like pulp and the flour from the liquid specifically in proportions identical with the proportions of the wet pulp to the liquid juice from which the juice was extracted and introducing steam to cause the powders to form a homogeneous mass and compressing said mass into various shapes.

RAYMOND E. SCHANZER.